United States Patent [19]

Kagechi et al.

[11] Patent Number: 4,937,137
[45] Date of Patent: Jun. 26, 1990

[54] SOLAR HEAT SELECTIVE ABSORBING MATERIAL AND ITS MANUFACTURING METHOD

[75] Inventors: Shunsaku Kagechi; Masanori Fujimoto, both of Osaka, Japan

[73] Assignee: Descente Ltd., Osaka, Japan

[21] Appl. No.: 109,526

[22] Filed: Oct. 19, 1987

[30] Foreign Application Priority Data

Oct. 31, 1986 [JP] Japan .................................. 61-260358
Aug. 7, 1987 [JP] Japan .................................. 62-198487

[51] Int. Cl.$^5$ ................................................ B32B 5/16
[52] U.S. Cl. ...................................... 428/242; 428/245; 428/254; 428/263; 428/283; 428/289; 428/328
[58] Field of Search ............... 428/245, 253, 263, 289, 428/368, 698, 242–244, 240, 283, 328, 254; 126/901

[56] References Cited

U.S. PATENT DOCUMENTS

| | | | |
|---|---|---|---|
| 4,048,980 | 9/1977 | Googin et al. | 126/901 |
| 4,098,956 | 7/1978 | Blickensderfer et al. | 126/901 |
| 4,334,523 | 6/1982 | Spanoudis | 126/901 |
| 4,507,354 | 3/1985 | Ishikawa et al. | 428/698 |
| 4,657,786 | 4/1987 | Sirinyan et al. | 126/901 |

FOREIGN PATENT DOCUMENTS 0085056  5/1983  Japan .................................. 126/901

Primary Examiner—Marion C. McCamish
Attorney, Agent, or Firm—Oblon, Spivak, McClelland, Maier & Neustadt

[57] ABSTRACT

An object of this invention is to provide a solar heat selective absorbing material of high performance which is prepared by using a diversity substrate by simple manufacturing methods. The construction of the solar heat selective absorbing material is such that a carbide of a transition metal belonging to the IV group of periodic table or a mixed powder of the carbide and the aluminum is applied directly or by means of a binder on the surface of the substrate to form a film. This solar heat selective absorbing material is manufactured by a method of forming a film of material, for example, ZrC on the surface of the substrate by high frequency sputtering or a method of mixing a mixed powder of the ZrC and Al with a resin binder and coating or printing the mixed material on the surface of the substrate.

3 Claims, 2 Drawing Sheets

(1)

(2)

SOLAR HEAT SELECTIVE ABSORBING MATERIAL AND ITS MANUFACTURING METHOD

BACKGROUND OF THE INVENTION

This invention relates to a solar heat selective absorbing material that absorbs solar energy efficiently and having a minimum loss by thermal radiation, and more particularly to a solar heat selective absorbing material prepared by forming a film of a material whose main component is a carbide of a transition metal belonging to the IV group of periodic table on the surface of a substrate, and to a method of manufacturing said material.

Recently, techniques of utilizing solar energy attract attention of those who are in the art and developments of thermoelectric power generation system using selective absorption films are in progress.

The radiation spectrum of sun is such that its peak is present in the vicinity of 0.5 $\mu$m, and over 95% of total energy is contained between 0.3 to 2.0 $\mu$m. For this reason, as quality of a material that selectively absorbs solar heat. A material must have high absorption in a wavelength region of 0.3 2.0 $\mu$m, and also, rate of radiation of heat is small in an infrared region of more than 2.0 $\mu$m.

Heretofore, a material of multifilm group such as a metal-dielectric multilayer film or semiconductor reflection preventive film has been developed as a solar heat selective absorbing surface.

The solar heat selective absorbing surface of the multifilm group is involved with a complicated process of forming the film so that a method of using a single material is effective for the simple formation of the film.

As the single material having excellent heat resistance property, carbon has heretofore been known, and also, recently, carbides of metals and the like which are advantageous in view of the heat resistance property are employed.

However, these materials have problems that cannot be sufficiently satisfied with respect to the performances. Accordingly, so far the solar heat selective absorbing material having satisfactory performance which is prepared by a simple method using the conventional film material has not been developed.

SUMMARY OF THE INVENTION

An object of this invention is to provide a solar heat selective absorbing material using a diversity substrate by a simple manufacturing method. Another object of this invention is to provide a solar heat selective absorbing performance to interior goods such as curtain and the like including clothings for sports and leisures.

These objects are achieved by providing a material construction of a solar heat selective absorbing material which is prepared by applying a carbide of a transition metal belonging to the IV group of the periodic table or a mixed powder of the carbide and aluminum directly or by means of a binder on the surface of the substrate to form a film.

The carbide of the transition metal belonging to the IV group of the periodic table such as the TiC, ZrC, HfC and the like and a mixture of said carbide and aluminum has qualities of absorbing the photoenergy of more than about 0.6 eV, and reflecting the low energy light, and the qualities work effectively for the selective absorption of the solar energy whose wavelength is 0.3–2.0 $\mu$m.

Therefore, the solar heat selective absorbing material prepared by forming a film of the single material of a compound material on the surface of the substrate exhibits the function for effective prevention of the solar energy.

BRIEF DESCRIPTION OF THE DRAWINGS

The drawings show a thermal pattern by a thermoviewer camera which is measured in an embodiment of this invention.

Among the drawings.

DETAILED DESCRIPTION OF PREFERRED EMBODIMENTS

Figure 1:
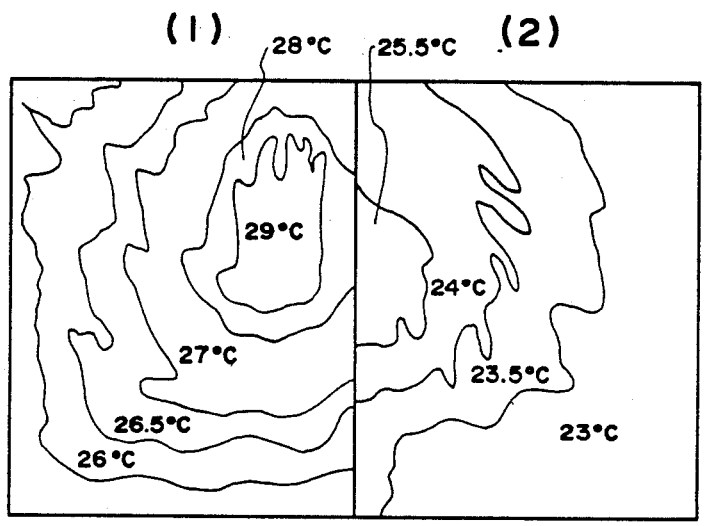
FIG. 1 shows a thermal pattern in the case of irradiation of the film formed surface of the solar heat selective absorbing material with an illuminating lamp of 500 W at a distance of 1.5 meters which is prepared by coating a fine powder of the ZrC on the substrate of Nylon fiber by means of a polyurethane resin binder.

The solar heat selective absorbing material according to this invention is characterized in the construction of the material prepared by forming a film of a carbide of a transition metal belonging to the IV group of the periodic table or the mixed powder of the carbide and aluminum on the surface of the substrate directly or by means of a binder.

As the carbide of the transition metal belonging to the IV group of the periodic table, the TiC, ZrC, HfC and the like are used but among these materials, the ZrC has the most effective solar heat selective absorbing property so that the ZrC is effectively used.

The foregoing carbide is used in the fine powder condition as the single material or is used in the mixed powder condition in which the metal aluminum is blended as the second component. These components are preferably as small fine powder as possible, and is desirably so adjusted that the particle diameter of the powder is less than 15 $\mu$m.

In case the carbide is used upon mixing with the aluminum, the mixing ratio of the aluminum against the carbide is effectively set at a ratio of 1:0.3–1.0, and when the ratio is out of this range, a degree of improvement of the solar heat selective absorbing property is deteriorated.

As the substrates, woven fabric produced from the organic material such as natural fiber, synthetic fiber, synthetic resin and the like or the inorganic materials such as carbon, ceramics and the like or the metallic materials, and the clothings such as knitted goods, nonwoven fabric and the like, and film and platelike material are enumerated.

On the surfaces of these substrates, the films consisting of the single materials of the carbide chosen from TiC, ZrC and HfC, or the compound components of the carbide and the aluminum are formed, but the formation of the films are carried out directly or by means of the binder as will be desired in the following.

The direct method is a method of forming the film by the high frequency chemical sputtering, and the thin film of the TiC, ZrC or HfC is formed on the surface of the substrate by using the high frequency sputtering device and feeding the Ar-$CH_4$ mixed gases into the system using the Ti, Zr or Hf as the target.

A method of interposing the binder is performed by mixing uniformly and dispersing the fine powder of the TiC, ZrC, HfC or the mixed powder of the Al with said fine powder in the binder, for example, polyurethane, polyacrylate, and other proper resin binder, and coating or printing the dispersed mixture on the surface of the substrate, and fixing the previously prepared dispersed mixture in the film form whereby the film is formed.

The film formation using this binder is not subjected to limitations such as the size of the substrate, shape and heat resistance and the like as compared with the direct method by the sputtering and moreover, it has the advantageous point making the continuous film formation possible. For this reason, for example, the thin woven fabric that allows the transmission of the visible light is used as the substrate, and the film is formed on the reverse surface by using the foregoing method, and such film provides the function as the solar heat selective absorbing material without changing the condition of the surface material. Accordingly, the resulting substrates are useful for ski wear, winter clothes which require heat insulation and waterproofness or interior goods such as curtain and the like.

This invention will be described in the following by referring to embodiments but the scope of this invention is not limited to them.

EXAMPLE 1

20 weight parts of the fine powder of ZrC was mixed at a ratio of 100 weight parts of the polyurethane resin binder, and the mixture was dispersed uniformly by a stirrer. This dispersion solution was coated on one surface of a cloth substrate of Nylon fiber, and then, the binder component was hardened.

For comparison purpose, the film was formed by only the polyurethane resin binder not mixed with the ZrC. (blank material).

The ZrC film material and the blank material which were formed with the films by the foregoing method were irradiated with the illuminating lamp of 500 W for photography at a distance of 1.5 meters, and the heat distribution condition of the surface was photographed by the thermoviewer camera in about 3 minutes.

Figure 2:
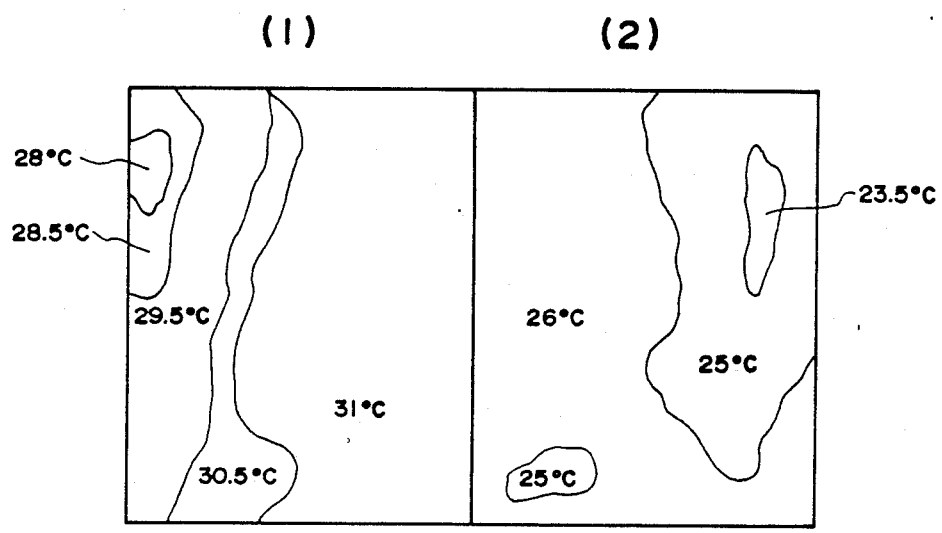
FIG. 2 shows a thermal pattern of the surface (opposite surface of the film formation) of an untreated material in the same condition.

FIG. 1 shows the thermal pattern in case the film formed surface was irradiated, and also, FIG. 2 shows the thermal pattern in case the surface of the untreated material (opposite surface of the film formed surface). In FIG. 1 and FIG. 2, (1) denotes the ZrC film material and (2) denotes the blank material.

From the results of FIG. 1 and FIG. 2, the thermal absorption of the ZrC film is found to be extremely effective as compared with the blank material.

EXAMPLE 2

5 parts of the ZrC powder whose particle diameter was less than 3 $\mu$m was blended with 3 parts of the aluminum powder whose particle diameter was less than 1 $\mu$m, and 20 weight parts of the mixed powder was mixed at a ratio of 100 weight parts of the polyurethane resin binder, and the mixture was uniformly dispersed in the stirrer. The dispersion solution was coated on one surface of the cloth substrate of the Nylon fiber, and the binder component was hardened.

For the comparison, the film formation was carried out only with the polyurethane resin binder not mixed with the ZrC—Al component (blank material).

The film formed ZrC Al film material and the blank material were irradiated with the illuminating lamp of 500 W for photography at a distance of 1.3 meters, and the thermal distribution condition of the surface was photographed by the thermoviewer camera in about 3 minutes.

Figure 3:
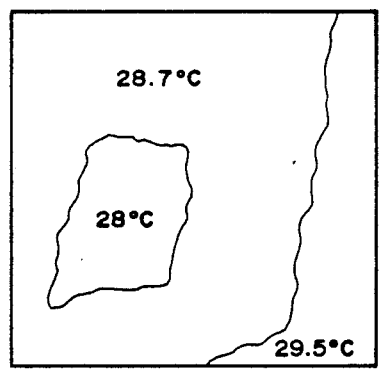
FIG. 3 shows a thermal pattern in the case of irradiation of the film formed surface of the solar heat selective absorbing material with an illuminating lamp of 500 W at a distance of 1.5 meters which is prepared by coating a mixed powder of ZrC and Al on the surface of a substrate of Nylon fiber cloth by means of a polyurethane resin binder.
Figure 3:
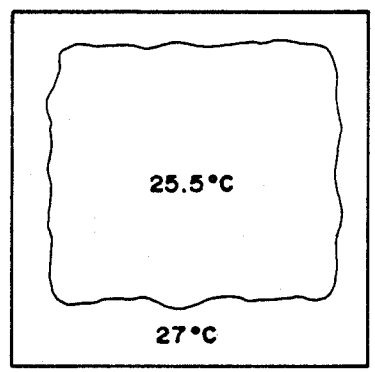

FIG. 3 shows the thermal pattern in case the film formed surface was irradiated. In FIG. 3, (1) denotes the ZrC+Al film material, and (2) denotes the blank material.

From the result of FIG. 3, the heat absorption of the ZrC+Al film material is recognized to be excellent as compared with the blank material.

What is claimed is:

1. A solar heat selective absorbing cloth material, comprising:
   a cloth substrate having a coating thereon consisting of a powdered carbide of one metal selected from the group consisting of Ti, Zr, and Hf, the diameters of the particles of the carbide powder being less than 15 $\mu$m, or a powder of said carbide and aluminum mixed together at a ratio ranging from 1:0.3–1.0, and a polyurethane or polyacrylate resin binder which fixedly attaches said powder to the cloth substrate.

2. The solar heat selective absorbing cloth material of claim 1, wherein said carbide is ZrC.

3. The solar heat selective absorbing cloth material of claim 1, wherein said resin is polyurethane resin.

* * * * *